United States Patent [19]

Kempf et al.

[11] Patent Number: 5,013,336
[45] Date of Patent: May 7, 1991

[54] METHOD AND APPARATUS FOR EMISSION CONTROL

[75] Inventors: Timothy W. Kempf; Robert F. Corcoran; Dennis C. Sikora, all of Newburgh, Ind.

[73] Assignee: Aluminum Company of America, Pittsburgh, Pa.

[21] Appl. No.: 431,289

[22] Filed: Nov. 3, 1989

[51] Int. Cl.$^5$ .................................... B01D 53/06
[52] U.S. Cl. ..................................... 55/71; 55/99; 55/73; 55/474; 34/57 A; 422/177; 423/240; 423/244; 423/245.1
[58] Field of Search .............. 55/71, 73, 99, 474, 55/240; 423/244, 245.1; 422/177; 34/57 A, 57 B

[56] References Cited

U.S. PATENT DOCUMENTS

| | | | |
|---|---|---|---|
| 3,177,631 | 4/1965 | Tamura | 55/28 |
| 3,179,341 | 4/1965 | Plos et al. | 239/414 |
| 3,213,918 | 10/1965 | Rudzki et al. | 158/11 |
| 3,443,360 | 5/1969 | Reeves | 55/71 |
| 3,503,184 | 3/1970 | Knapp et al. | 55/71 |
| 3,719,029 | 3/1973 | Suzukawa et al. | 55/91 |
| 3,811,823 | 5/1974 | Warshawsky | 432/80 |
| 3,907,971 | 9/1975 | Bohm et al. | 423/240 |
| 3,949,684 | 4/1976 | Copeland | 423/244 A |
| 3,977,846 | 8/1976 | Russell et al. | 55/79 |
| 3,992,176 | 11/1976 | Bohne et al. | 55/71 |
| 4,006,066 | 2/1977 | Sparwald | 55/71 |
| 4,065,271 | 12/1977 | Weckesser et al. | 55/71 |
| 4,604,050 | 8/1986 | Henriksson | 431/121 |
| 4,656,971 | 4/1987 | Eaton et al. | 122/4 D |
| 4,748,916 | 6/1988 | Nordh | 110/182.5 |

FOREIGN PATENT DOCUMENTS 1448369 9/1976 United Kingdom .

Primary Examiner—Bernard Nozick
Attorney, Agent, or Firm—Douglas G. Glantz

[57] ABSTRACT

The invention includes process and apparatus for removing pollutants from a gas including fluidizing a bed of particles in a container, introducing a gas containing pollutant into the bed, removing the pollutant through deposition on the particles, controlling temperatures in the container by injecting coolant fluid through a coolant nozzle, and reducing clogging or fouling on the coolant nozzle. The process and apparatus includes controlling temperatures in the container within narrowly specified ranges of temperatures and providing a constant pressure of coolant fluid and constant pressure of purge gas to the coolant nozzle such that interchangeable selection made between the coolant fluid and purge gas in a time period sufficiently short provides accurate temperature control and reduces clogging or fouling on the coolant nozzle.

18 Claims, 4 Drawing Sheets

METHOD AND APPARATUS FOR EMISSION CONTROL

This invention relates to process and apparatus for controlling emissions from carbon baking furnaces.

BACKGROUND

Aluminum is produced today predominantly from smelting alumina in aluminum reduction cells, commonly referred to as Hall-Heroult cells after the original developers Hall (in the United States) and Heroult (in France). The Hall-Heroult cells use carbon anodes to reduce alumina electrolytically to produce aluminum which collects in a pool of aluminum metal at the base of the cell.

The carbon anodes for the Hall-Heroult cells are formed from blending coke and pitch to an appropriate composition, molding, and baking. The carbon anodes are formed and then baked in a "ring" furnace. The anodes are packed with petroleum coke and fired in the pit-type ring furnace, so-called because of the circular pattern in which the baking operation is performed.

A circular operation derives from selecting sections of a ring furnace containing anodes which have been baked and are cooled down to be removed later in a coolant zone. Just ahead of the coolant zone are sections being fired. Ahead of the firing zone are preheat sections containing green carbon anodes preheated by hot flue gas coming from the firing zone. When baking is completed in the firing zone, e.g., after about 48-60 hours, burners are moved to the preheat sections which then become the firing zone. Burners are moved (after each baking cycle) down one side of the furnace building and up the other side in the opposite direction in a circular firing pattern from which the name ring furnace derives.

In the baking process in the ring furnace, hydrocarbons are driven off in the firing zone and generally are oxidized completely.

Hydrocarbons evolving from the preheat sections, on the other hand, where temperatures range down to about 250° C., are oxidized only partially.

Hydrocarbons together with coke dust from the packing in the ring furnace are drawn through cracks in the flues of the furnace and into the flue gas to form an orange-brown fume characteristic of carbon baking furnaces. Hydrocarbon vapors condense as they cool to form a fume with an average particle size of about 0.6 microns. High visibility of the fume is caused by the large number of particles in the 0.1-1.0 micron range even though the total grain loading is usually less than about 0.1 grain/SCF in a typical furnace waste gas stream.

Emission control of the particles in the size range of about 0.1-1.0 micron generally poses difficult challenges. Wet systems such as high energy venturi scrubbers and wet electrostatic precipitators require extensive water treatment subsequent to the hydrocarbon removal. Dry systems such as incinerating systems involve large volumes of gas resulting in a cost of operation which is prohibitive except when the fuel value of the pollutant in the waste gas is sufficient to justify the capital expenditure or when the total volume of gas is relatively small. In carbon baking furnaces, the combustibles concentration is very small but the total gas volume is very large making incinerators not the emission control of choice.

In addition to the hydrocarbons, other pollutants such as sulfur and fluorine come from the carbon baking furnace. These other gaseous pollutants need to be cleaned from the waste gas, too.

Because of these problems, a pollutant scrubbing process needs to be developed to overcome the drawbacks of conventionally available processes and to provide the emission control necessary for the hydrocarbon and other pollutants coming from the ring furnace for baking carbon anodes.

SUMMARY OF THE INVENTION

It is an object of the present invention to provide a process and apparatus for removing pollutants from a gas in a fluidized bed of particles.

It is a further object of the present invention to control the temperature of a fluidized bed within narrowly specific temperature ranges.

It is a further object of the present invention to provide a process and apparatus for removing pollutants from carbon anode baking furnaces in a fluidized bed including cooling the bed with a coolant sprayed through a nozzle.

It is yet another object of the present invention to provide a process and apparatus for removing pollutants in a fluidized bed including cooling the bed with a coolant sprayed through a nozzle and further reducing clogging or fouling on the coolant nozzle.

These and other objects of the present invention will become apparent from the detailed description which follows.

The invention includes process and apparatus for removing pollutants from a gas including fluidizing a bed of particles in a container, introducing a gas containing pollutant into the bed, removing the pollutant through deposition on the particles, controlling temperatures in the container by injecting coolant fluid through a coolant nozzle, and reducing clogging or fouling on the coolant nozzle. The process and apparatus include controlling temperatures in the container within narrowly specified ranges of temperatures and providing a constant pressure of coolant fluid and constant pressure of purge gas to the coolant nozzle such that interchangeable selection made between the coolant fluid and purge gas in a time period sufficiently short provides accurate temperature control and reduces clogging or fouling on the coolant nozzle.

DETAILED DESCRIPTION

In carbon baking furnaces commonly referred to as "ring" furnaces, anodes intended for use in the electrolytic production of aluminum in a Hall-Heroult cell are cured under a high temperature, e.g., on the order of about 1200° C. and under an oxygen-deficient atmosphere to produce finished carbon anodes. The anodes initially are formed from coke and coal tar pitch before being cured in the ring furnace. Products from the combustion of natural gas and the combustion of volatile compounds emitted from the anodes are exhausted from the ring furnace and require treatment to remove hydrocarbons, sulfur, and fluorine pollutants.

Figure 1:
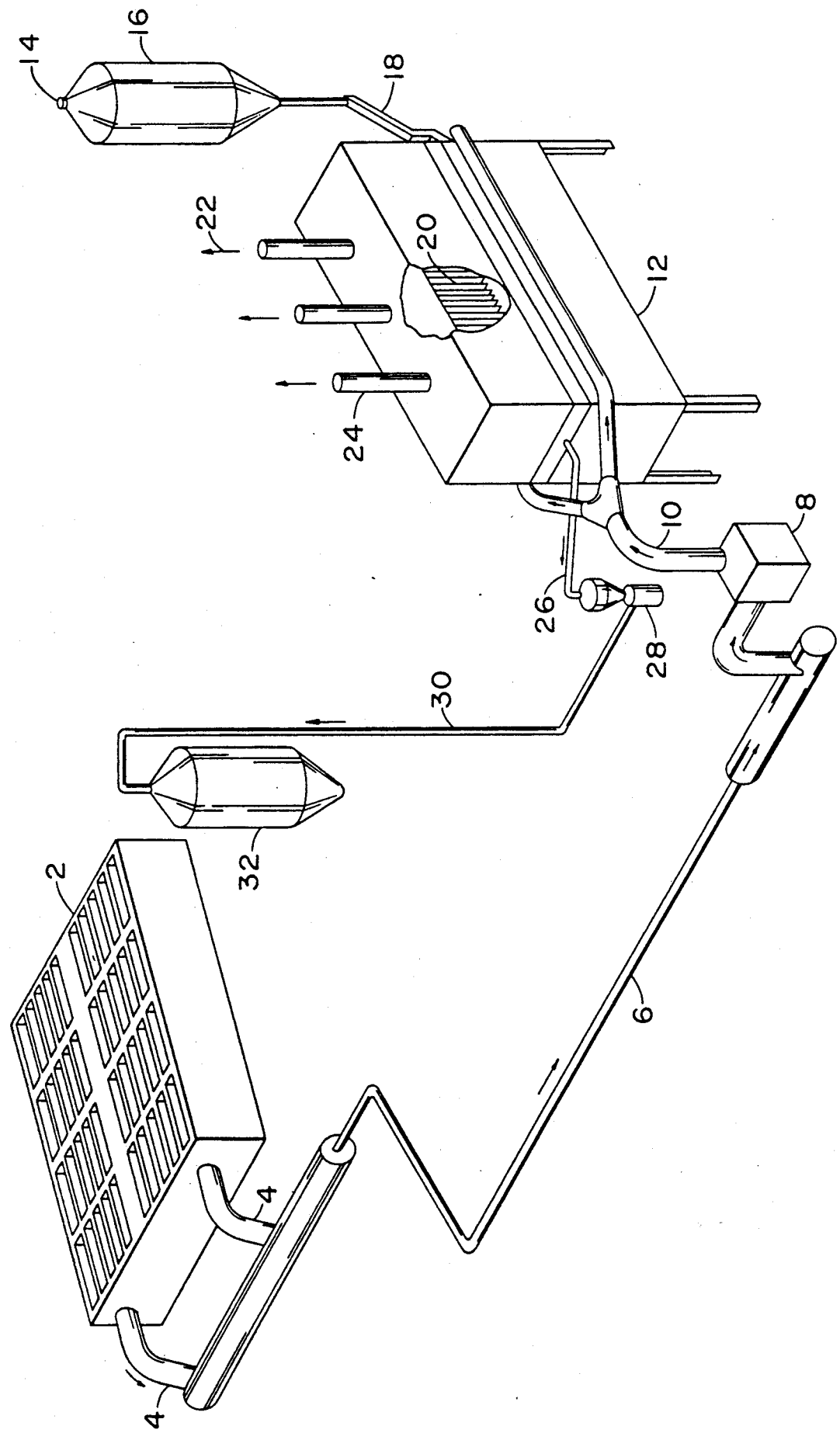
FIG. 1 shows an emission control system for treating waste gases from a carbon baking furnace.

Referring to FIG. 1, carbon anodes are heated in carbon baking ring furnace 2. Process gas emissions from the ring furnace are channeled through waste gas conduits 4. Hot furnace exhaust gases, including products of combustion from the furnace burners and vapors evolved from the baking of the carbon anodes, are drawn sequentially through the furnace exhaust manifold, side main, and main fume duct outside the ring furnace building.

Temperatures in the waste gas conduits 4 are maintained at elevated levels to avoid condensation of tar-like substances from the flue gas on any surface below about 350° C. Elevated temperatures must be maintained to avoid the deposits which cause maintenance problems and can cause duct work fires to ignite.

Waste gases are channeled through conduit 6 to a main waste gas fan 8 rated, for example, at 45,000 ACFM at 46 inches SPWG at 400° C. The main waste gas fan 8 draws the fume and blows it into reactor 12 via gas distribution pipes.

Alumina is fed at 14 to an alumina supply storage tank 16 for holding prior to feeding in line 18 to reactor 12. Alumina is fed from alumina storage tank 16 through line 18 by air gravity conveyor.

The waste gas fed in line 10 to reactor 12 is channeled at elevated temperatures into a fluidized bed formed from the alumina fed to the reactor in line 18. Pollutants are removed from the waste gas by deposition on the alumina in the fluidized bed as described in more detail hereinbelow.

Purified waste gases are passed through particulate collection filters 20 and then are withdrawn at 22 from the reactor in overhead vents 24. Alumina is discharged at 26 to a pneumatic conveyor system 28 and passed to a alumina return tank 32.

Figure 2:
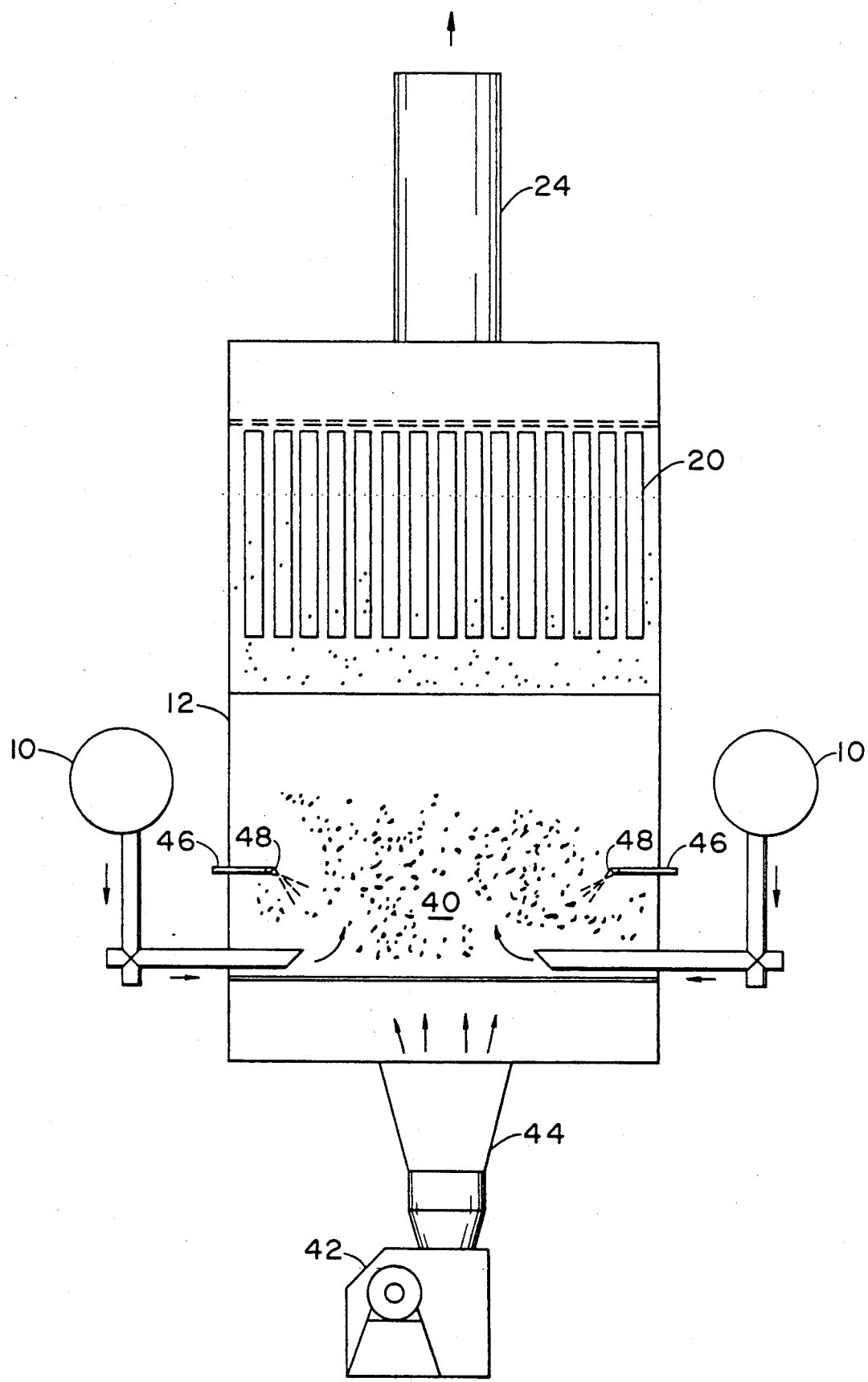
FIG. 2 is a schematic of a fluidized bed container or reactor in accordance with the present invention.

Referring now to FIG. 2, pollutant removal container or reactor 12 holds a fluidized bed of particles 40 maintained in fluidized condition by fluidizing air fan 42 blowing through conduit 44 and distributor plate immediately below the fluidizing bed 40. A fluidizing air fan 42 is provided rated at 7500 SCFM 40, 40 WG (Water Gauge), 70° F., 75 HP, 1800 RPM.

Waste gas from the carbon baking furnace is fed through waste gas manifold 10 and into the fluidized bed of the container/reactor 12 Subsequent to contacting the fluidized bed, the waste gas effluent is passed through particulate filters 20 and then exits the container at effluent conduit 24.

A coolant fluid is introduced in line 46 for temperature control to be applied directly through coolant nozzle 48 for spraying directly into bed 40.

Temperature control ordinarily is done by heat exchanger means, for example, by using heat exchanger cooling coils on a heat exchanger tube side through which coolant is passed indirectly in heat exchange with the fluidized bed to cool the bed on the shell side of the heat exchanger. This involves considerable expense for bulk cooling apparatus. Adding, e.g., by spraying, a coolant liquid or fluid directly to the bed generally was thought not to be feasible, however, because of wetting or agglomeration of the particles, entrainment of liquid droplets in the gas stream, or undesirable accumulation of water in some areas of the bed.

Figure 3:
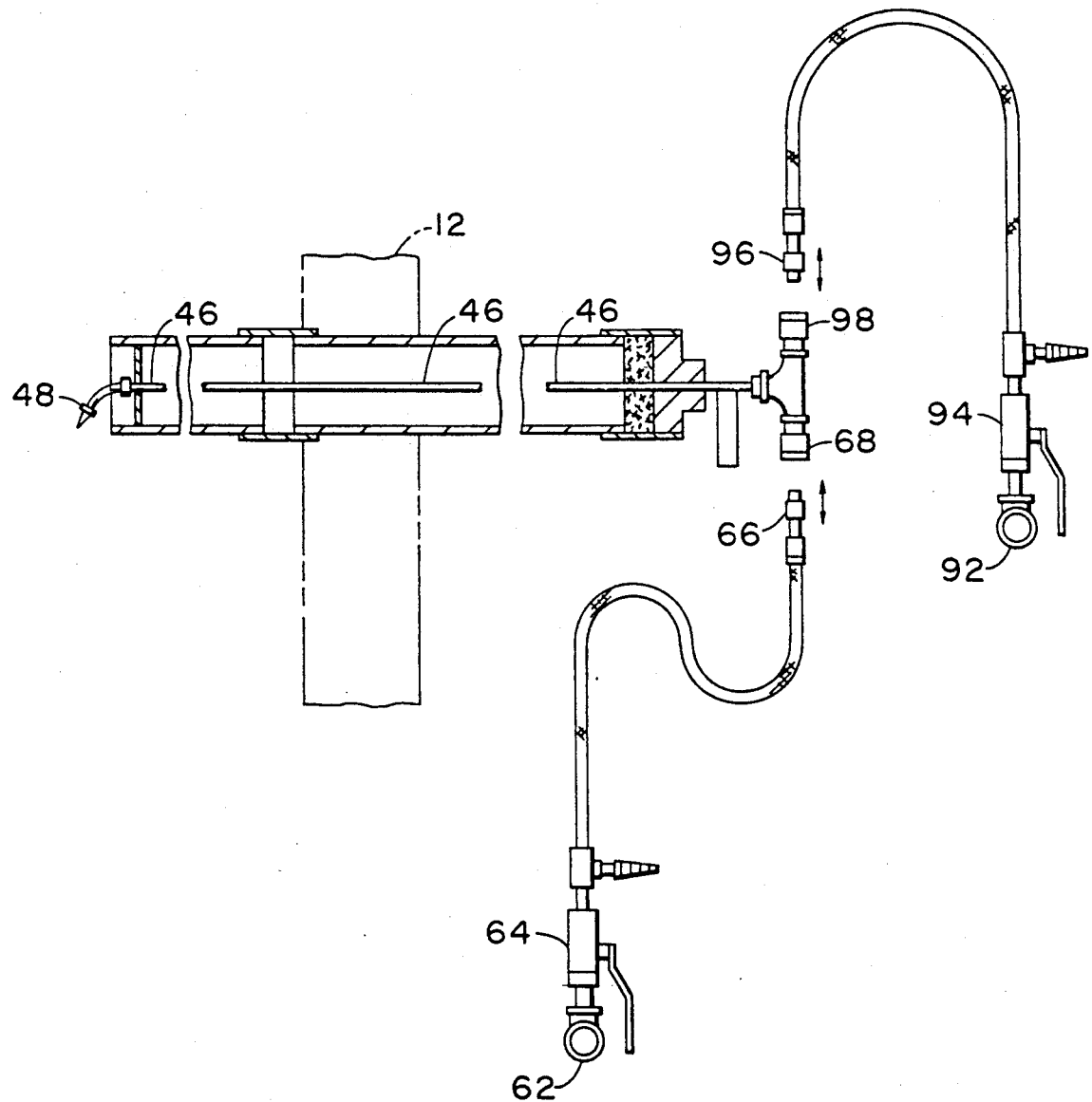
FIG. 3 shows a coolant spray nozzle and piping connections in accordance with the present invention.

However, we have found that our process and apparatus for emission control of pollutants from a carbon baking furnace can be controlled in prescribed temperature ranges by spraying water directly into the fluidized bed of particles in accordance with the present invention. Referring to FIG. 3, a coolant nozzle 48 suitable for spraying coolant fluid in accordance with the present invention is shown including hydraulic connections for providing a coolant fluid and a purge gas such that the coolant fluid is provided at a constant pressure and the purge gas is provided at a constant pressure through hydraulic connections immediately adjacent to the coolant nozzle such that an interchangeable selection can be made between the coolant fluid or the purge gas at a time period sufficiently short to control the temperature and to reduce clogging or fouling on the coolant nozzle.

Figure 4:
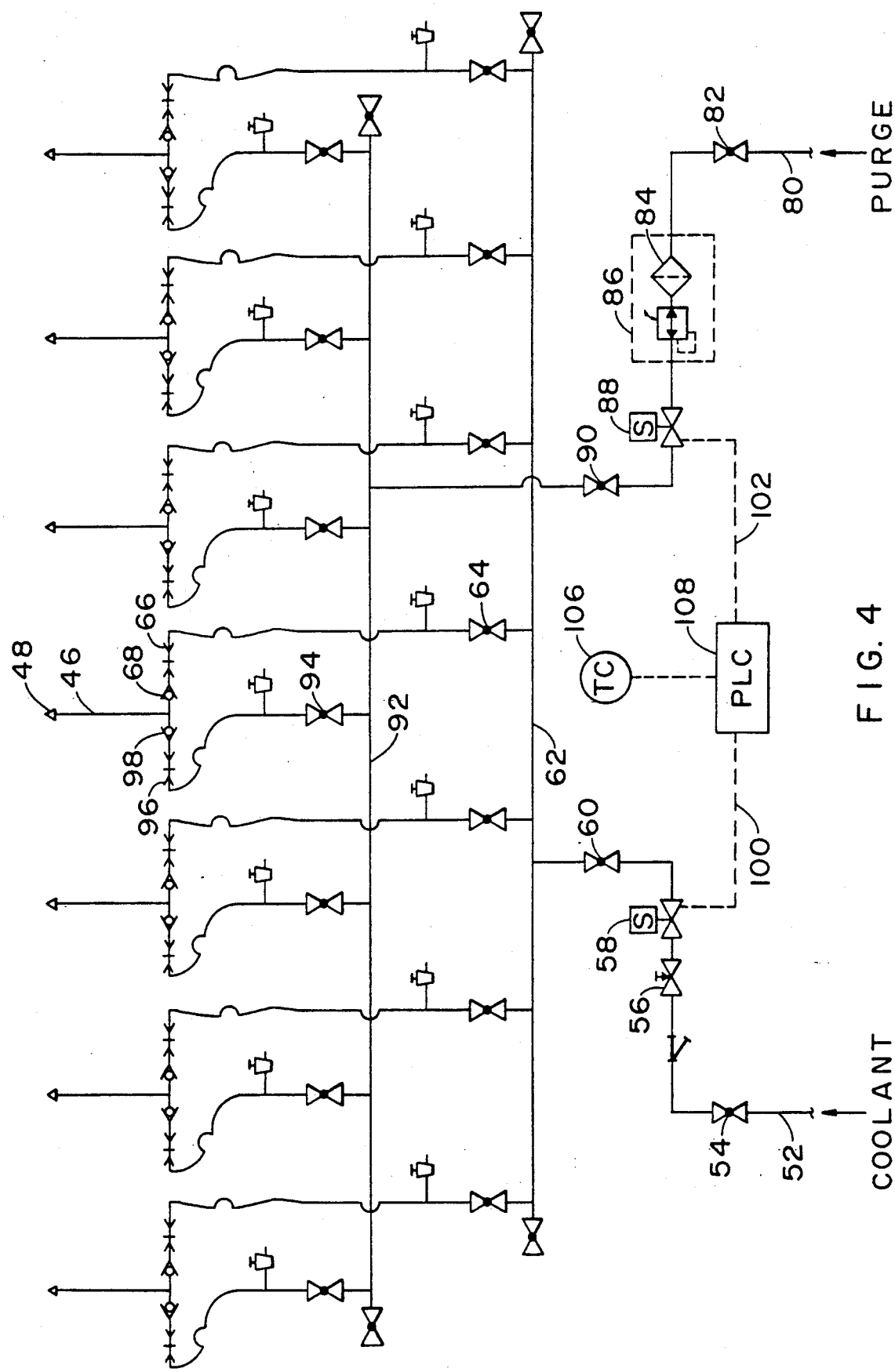
FIG. 4 is a schematic diagram of a fluid flow system including coolant fluid flow and purging gas flow to a coolant spray nozzle in accordance with the present invention.

Referring to the schematic of FIG. 4, coolant fluid, e.g., such as water (in one aspect), is provided in line 52 and passes through ball valve 54 to needle valve 56 and solenoid valve 58 prior to passing through ball valve 60 to trunk line 62 for distribution to each of seven nozzle systems in the zone of the schematic shown in FIG. 4. Each nozzle is supplied by water through ball valve 64 and attached to the coolant spray nozzle through quick connector 66 for connecting to check valve 68 on the water side of nozzle 48.

Pressurized purge gas, e.g., air or nitrogen, is supplied in line 80 through ball valve 82, gas filter 84, and pressure regulator 86 to solenoid valve 88 prior to distribution through ball valve 90 to trunk line 92 for supplying each nozzle system through ball valve 94 to quick disconnect means 96 attached to check valve 98 prior to feeding nozzles 48.

Actuating line 100 on the coolant side and actuating line 102 on the purge supply side of the nozzle are connected to an automatic control system including one or more thermocouple sensors 106 in the bed and a programmable logic controller 108 to control the flow of either the coolant or purge gas through solenoid valves 58 and 88 to control temperatures in the fluidized bed.

Seven nozzles are provided in each zone as represented in FIG. 4.

We have found that the process and apparatus in accordance with the present invention provide an emission control system for removing pollutants from waste gas and effluent from a carbon baking furnace including hydrocarbons, sulfur emissions, and fluorine emissions. It has been found surprisingly that the process and apparatus in accordance with the present invention can control temperatures within zones of the fluidized bed container or reactor and in areas adjacent to or at or near the nozzles of the container or reactor within narrowly specific temperature ranges including temperatures prescribed in the ranges of plus or minus 10° C., and even can be controlled to temperatures prescribed within plus or minus 5° C. In certain situations, the present invention can be operated to control temperatures in the container or reactor to within a temperature range of plus or minus 1° C. and even to within plus or minus 1° F.

The present invention is operated by providing a constant pressure of coolant fluid and a constant pressure of a purge gas to the coolant nozzles such that an interchangeable selection made between the coolant fluid and the purge gas in a time period sufficiently short provides temperature control and reduces clogging or fouling on the coolant nozzle.

The coolant nozzle and the hydraulic system supplying the coolant nozzle are constructed of materials which are low oxidizing, i.e., materials such as stainless steel, copper, or brass Plastics may also be used as a non-corrosive material of construction for the supply to the coolant nozzle so long as an insulating material protects the plastic from the temperature of the reactor or container of the fluidized bed.

Waste gas containing pollutant from the carbon baking furnace and fed to the reactor has a temperature in the range of about 250° C. Upon entering the fluidized bed, the temperature is controlled to be below about 77° C., so that the pollutants such as hydrocarbons, sulfur pollutants, and fluorines are deposited on the particles through condensation reactions. The temperature also must be controlled below about 107° C. so that no degradation occurs on the particulate collector such as bags of polyester used in the container above the fluidized bed to collect particulate.

The particles of the fluidized bed can be alumina, carbon, sand, silicon, or calcium carbonate, but alumina is preferred when removing hydrocarbons and pollutants from the offgases from kilns, ring furnaces, tunnel furnaces, or the like used in baking carbon anodes, because alumina then can be fed to the smelting pot for the production of aluminum by the reduction of alumina.

The coolant spray nozzles are positioned to spray coolant fluid, e.g., such as water, into the fluidized bed at a level approximately 16 inches of the distance into the fluidized bed measuring from the bottom to the top.

Commercial operations of processes to control hydrocarbon emissions from carbon baking furnaces conventionally have suffered from major problems with direct cooling including problems of build-up of solids in or on the spray nozzle tip because of dissolved salts in the water, dust or condensable compounds in the gases, or dust produced by the fluidized particles. Such solids build-up has prevented the nozzle from producing the fine spray necessary for rapid evaporation. In addition, water could accumulate in the system and flow as a stream from the evaporative core or soak the fluid bed.

The process and apparatus of the present invention solve these problems and prevents the build-up of solids in or on the nozzle tip with a system for delivering coolant fluid and purge gas to the coolant nozzle. The present invention provides an interchangeable source of coolant fluid, e.g., such as water at a pressure of about 40 psig, and also provides an alternative interchangeable source of purge gas, e.g., such as air at about 32 psig to the coolant nozzle. By interchangeable is meant an ability to changeover simultaneously with the supply of the alternate source, coolant fluid or purge gas. When coolant is required by the process, coolant fluid is introduced into the coolant branch of the piping leading to the nozzle. The fine spray of coolant fluid is produced for cooling. When no more cooling is needed, a solenoid valve and the coolant fluid circuit shuts off the coolant fluid. The process and apparatus of the invention provide for a simultaneous changeover to purge gas immediately upon the closing of the coolant fluid valve. The simultaneous changeover is provided by another valve on the parallel line opening up and introducing a high pressure, e.g., about 32 psig, purge gas to the coolant nozzle. The use of the high pressure purge gas serves two purposes including purging all residual coolant fluid from the nozzle so that heat will not evaporate the coolant fluid leaving a film of solid behind and further including flushing the area adjacent to the nozzle continuously with air, thereby preventing dust from the gas stream in the fluid bed from depositing on the nozzle tip until coolant fluid is turned on again.

The present invention has been installed on a full-size unit with alternating coolant water and purge air for cooling of an alumina fluidized bed to cleanup waste gas from carbon anode baking furnaces. We have found that the present invention provides for a substantial reduction in maintenance of coolant nozzles which previously had to be replaced ever six to eight weeks. Since introduction, the process and apparatus of the present invention have been operating on a full-size unit substantially longer than previously possible or even thought possible, and nozzles have not yet needed to be replaced.

It has been found that the process and apparatus of the present invention, operated in accordance with the above description, have provided a totally unexpected and surprising temperature control such that the temperature range within the bed can be controlled within plus or minus 1° F. Prior to installation of the present invention, temperatures were only controllable over temperature ranges of about 15° F. (8° C.).

While the invention has been described in terms of preferred embodiments, the claims appended hereto are intended to encompass all embodiments which fall within the spirit of the invention.

What is claimed is:

1. A process for removing a substance from a gas comprising:
   (a) fluidizing a bed of particles in a container;
   (b) introducing a gas containing a substance into said bed;
   (c) removing said substance through deposition on said particles;
   (d) controlling temperatures in the container by injection coolant fluid through a coolant nozzle; and
   (e) providing a pressure of coolant fluid and a pressure of a purge gas to said coolant nozzle such that interchangeable selection can be made between said coolant fluid and purge gas in a time period sufficiently short to control said temperatures and to reduce clogging or fouling on said coolant nozzle.

2. A process as set forth in claim 1 comprising making said interchangeable selection between coolant fluid and purge gas in less than about one second.

3. A process as set forth in claim 1 wherein said coolant fluid comprises a liquid which evaporates to provide a cooling effect.

4. A process as set forth in claim 3 wherein said coolant fluid comprises water and said purge gas comprises air.

5. A process as set forth in claim 4 wherein said coolant nozzle is made of stainless steel, copper, or brass.

6. A process as set forth in claim 4 wherein piping upstream of said coolant nozzle is made of a non-corrosive material of construction.

7. A process as set forth in claim 6 wherein said piping is made of plastic.

8. A process as set forth in claim 1 comprising establishing a series of said coolant nozzles, wherein said controlling temperatures by injecting coolant fluid through said nozzles is performed independently for each nozzle or group of nozzles to maintain said temperature in said container.

9. A process as set forth in claim 8 further comprising determining the temperature at or near each said coolant nozzle or group of nozzles and automatically selecting coolant fluid or pressurized purge gas to control said temperature at or near each coolant nozzle or group of nozzles.

10. A process as set forth in claim 1 further comprising withdrawing from said bed and passing withdrawn gases through a particulate collector.

11. A process as set forth in claim 10 wherein said particulate collector comprises filters for the collection of particulates wherein the filters comprise material degradable at a temperature above the temperatures obtained from said controlling step.

12. A process for removing hydrocarbon, sulfur, or fluorine pollutants from a gas comprising:
(a) collecting waste gas from a carbon baking furnace in a waste gas stream containing one or more pollutants at an elevated temperature;
(b) passing said waste gas stream through a fluidized bed of alumina particles in a reactor to remove a pollutant selected from the group consisting of hydrocarbon, sulfur, or fluorine through deposition on said alumina particles to form a purified effluent;
(c) passing said purified effluent through a particulate collector; and
(d) injecting a coolant fluid to the fluidized bed through coolant nozzles connected to a first stream of coolant fluid under pressure and a second stream of pressurized purge gas of air wherein said first and second streams can be interchangeably selected in an interval sufficiently short to reduce clogging or fouling on said coolant nozzles.

13. A process for removing hydrocarbon, sulfur, or fluorine pollutants from a gas comprising:
(a) collecting from a carbon baking furnace a waste gas stream containing one or more pollutants selected from the group consisting of hydrocarbon, sulfur, or fluorine at an elevated temperature;
(b) passing said waste gas stream through a fluidized bed of alumina particles to remove said pollutants through deposition on said alumina particles to form a purified effluent;
(c) passing said purified effluent through a particulate collector; and (d) controlling temperature by injecting coolant fluid through coolant nozzles within said reactor and reducing clogging or fouling in said coolant nozzles by injecting water into the fluidized bed through coolant nozzles and by providing a pressurized purge of air operated in a changeover period sufficiently short to increase the service life of said coolant nozzles.

14. Apparatus comprising:
(a) a container having an inlet and an outlet;
(b) a fluidized bed of particles located between the inlet and outlet in the container;
(c) means for introducing waste gas into the bed;
(d) a nozzle for injecting coolant into the fluidized bed;
(e) means for providing a pressure of coolant and a pressure of purge to the nozzle; and
(f) valve means for providing a quick changeover selection between the coolant and the purge in a time period sufficiently short to provide temperature control and to reduce clogging or fouling on the coolant nozzle without removing the nozzle from the container.

15. The apparatus according to claim 14 comprising automatic sensing means of one or more thermocouple sensors in the fluidized bed and control means to control flow of the coolant or the purge to the nozzle in response to the thermocouple sensor.

16. The apparatus according to claim 15 wherein the control means comprises a programmable logic controller and a solenoid valve for controlling flow of the coolant or the purge.

17. The apparatus according to claim 16 wherein the nozzle and the means for providing a pressure of coolant and a pressure of purge to the nozzle are made of non-corrosive material such as stainless steel, copper, brass, or plastic.

18. The apparatus according to claim 17 wherein the means for providing a pressure of coolant and a pressure of purge comprises a check valve for the coolant and a check valve for the purge, the check valves located in close proximity to the nozzle to facilitate the quick changeover from coolant to purge.

* * * * *

UNITED STATES PATENT AND TRADEMARK OFFICE
CERTIFICATE OF CORRECTION

PATENT NO.   : 5,013,336

DATED        : May 7, 1991

INVENTOR(S)  : Timothy W. Kempf; Robert F. Corcoran; Dennis C. Sikora

It is certified that error appears in the above-identified patent and that said Letters Patent is hereby corrected as shown below:

Claim 10,                After "withdrawing" insert --gases--.
Col. 7, line 6

Signed and Sealed this

Eighth Day of September, 1992

Attest:

DOUGLAS B. COMER

*Attesting Officer*         *Acting Commissioner of Patents and Trademarks*